(12) United States Patent    (10) Patent No.: US 7,613,253 B2
Weinholt    (45) Date of Patent: Nov. 3, 2009

(54) NOISE BALANCED QAM DETECTION

(75) Inventor: Dan Rutger Weinholt, Västra Frölunda (SE)

(73) Assignee: Telefonaktiebolaget L M Ericsson (PUBL), Stockholm (SE)

( * ) Notice: Subject to any disclaimer, the term of this patent is extended or adjusted under 35 U.S.C. 154(b) by 605 days.

(21) Appl. No.: 10/519,609

(22) PCT Filed: Jul. 3, 2002

(86) PCT No.: PCT/SE02/01324

§ 371 (c)(1), (2), (4) Date: Sep. 21, 2005

(87) PCT Pub. No.: WO2004/006527

PCT Pub. Date: Jan. 15, 2004

(65) Prior Publication Data

US 2006/0083334 A1    Apr. 20, 2006

(51) Int. Cl.
*H03D 1/24* (2006.01)

(52) U.S. Cl. .................. 375/320; 375/316; 375/332; 455/130

(58) Field of Classification Search ............ 375/316, 375/320, 332
See application file for complete search history.

(56) References Cited

U.S. PATENT DOCUMENTS

| 4,330,861 | A | * | 5/1982 | Impallomeni et al. ....... 375/235 |
| 4,555,790 | A | | 11/1985 | Betts et al. |
| 4,683,578 | A | | 7/1987 | Betts et al. |
| 4,859,956 | A | * | 8/1989 | Mizoguchi .................. 329/304 |
| 5,519,356 | A | | 5/1996 | Greenberg |
| 5,533,071 | A | | 7/1996 | Krishnamurthy et al. |
| 5,684,842 | A | * | 11/1997 | Daffara ....................... 375/354 |
| 5,754,591 | A | * | 5/1998 | Samueli et al. ............. 375/235 |
| 5,796,786 | A | * | 8/1998 | Lee ............................. 375/326 |
| 6,385,233 | B1 | * | 5/2002 | Berger ........................ 375/216 |
| 6,826,238 | B2 | * | 11/2004 | Ahn ............................ 375/326 |
| 6,940,923 | B2 | * | 9/2005 | Ohishi ........................ 375/326 |
| 6,983,028 | B2 | * | 1/2006 | Ahn ............................ 375/326 |

OTHER PUBLICATIONS

Mouaki Benani, A et al, "Comparison of Carrier Recovery Techniques in M-QAM Digital Communication Systems" In: 2000 Canadian Conference on electrial and Ocmputer Engineering, Halifax, NS, Canada, Mar. 7-10, 2000, vol. 1., pp. 73+77, INSPEC Accession No. 6691171, see the whole document.

* cited by examiner

*Primary Examiner*—Shuwang Liu
*Assistant Examiner*—Leon Flores (57) ABSTRACT

A method of demodulating digital data using M'ary QAM has been disclosed, comprising the steps of detecting a complex symbol vector D, establishing within which reference symbol boundaries the detected symbol vector D falls, the given reference symbol boundaries being associated with a complex reference vector R. Quadrature components (E_I and E_Q) of an error vector (E) constituting the difference between the detected vector D and the associated reference vector R are found and an error control signal (E') as feed back signal in the demodulation stage is approximated. The influence of thermal noise in the receiver stage has been limited by a weighting and/or by noise balancing.

8 Claims, 10 Drawing Sheets

Fig. 1

Prior Art

Fig. 2

Prior Art

Prior Art

Fig. 13
128 QAM

NOISE BALANCED QAM DETECTION

FIELD OF THE INVENTION

The present invention relates to principles of phase modulation coding and decoding, which may be utilised in various types of telecommunication systems. The invention is especially applicable for radio communication systems.

BACKGROUND OF THE INVENTION

A commonly used principle for transmitting data over a radio channel and for overcoming the signal rate limitation of binary sequence signalling is to make use of four or more unique symbols. Thereby, the bit rate can exceed the maximum signal rate (in bits/s) corresponding to double the passband (in Hz) as given by the Nyquist theorem.

Quadrature phase shift keying (QPSK) also denoted 4-state quadrature amplitude modulation (4-QAM) involves that two-bit words are coded into four discrete symbols. These symbols can be represented as signal vectors in the complex plane having constant amplitude but four distinct phase values in relation to a reference signal. Detection is carried out by establishing to which quadrant in the complex plane the received signal can be referred.

If a higher modulation order is used, the bit rate can be increased further. However, higher requirements are inflicted on the detection stage since it becomes more difficult to distinguish the individual symbols from one another, as they appear closer in the complex plane. The deterioration of the signal as transmitted over a given media also constitutes a limitation to the possible number of symbols being used.

Higher order keying is commonly referred to as M'ary QAM, where $M=2^N$ refers to the number of discrete symbols being available, whereby N bits can be transmitted per symbol. M'ary QAM is also referred to as M'ary APK (amplitude phase shift keying), as both the amplitude and phase may vary for individual symbols.

Figure 1:
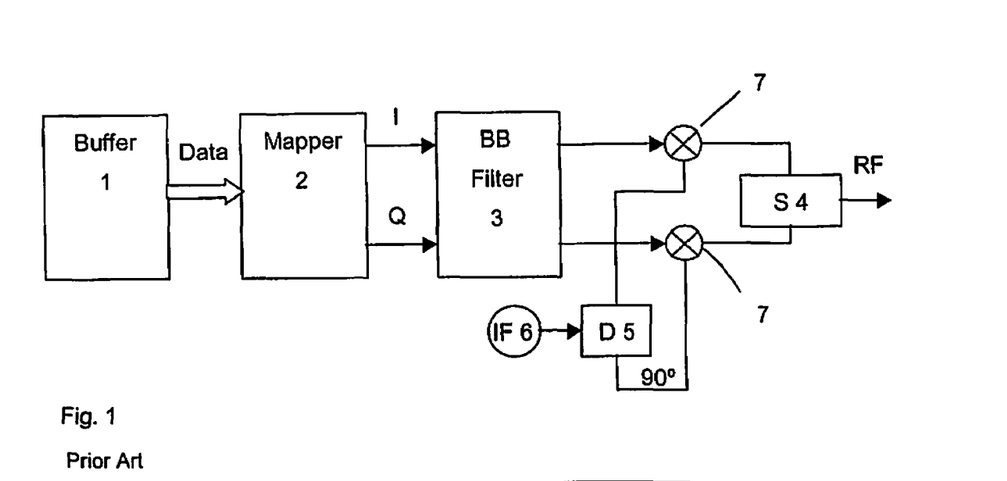
FIG. 1 shows a known transmitter.
Figure 2:
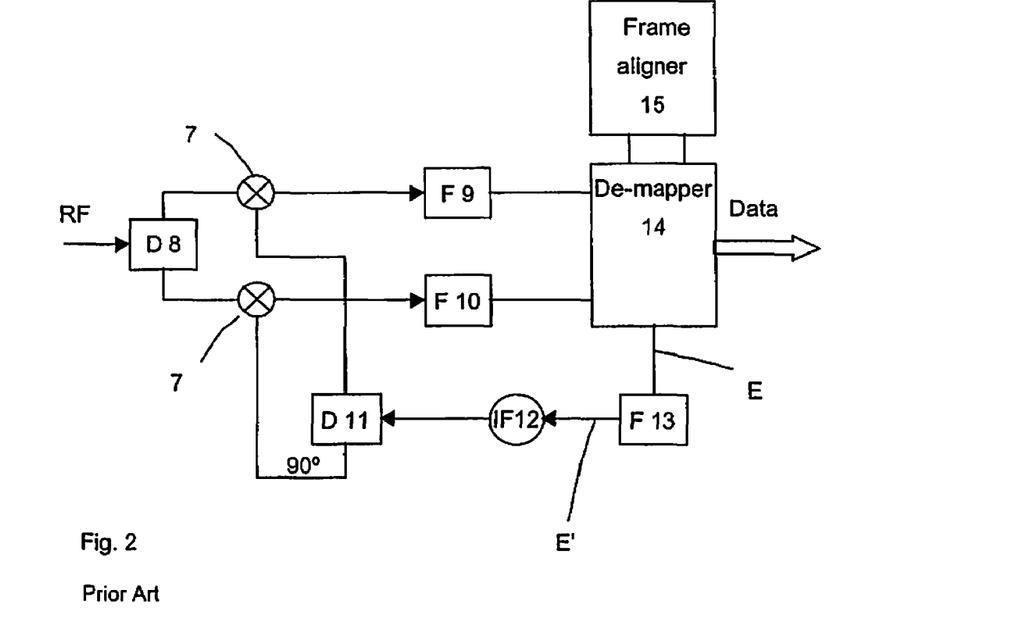
FIG. 2 shows a known receiver.

FIG. 1 shows a conventional transmitter and FIG. 2 shows a conventional receiver.

The transmitter unit comprises a data buffer 1, a mapper 2, baseband filtering unit 3, intermediate frequency (IF) oscillator 6, phase divider 5, adders 7, and summer 4 from which a radio frequency (RF) signal is transmitted.

Data stored temporarily in buffer 1 is conveyed to the mapper 2 in accordance with the rate data can be transmitted over the radio interface. The data, which can be seen as a binary bit serial string, is partitioned into symbols by the mapper 2 having an I component and Q component in the complex plane as explained above.

The receiver, on the other hand, decodes I and Q components multiplying the incoming signal (RF) with 90 degree phase skewed signals provided by signal oscillator IF12 from divider D11. The signal of IF 12 is typically rendered coherent by means of a carrier recovery PLL (phase locked loop) with the carrier signal from IF 6, such that the RF signal, after being filtered in respective filters 9 and 10, can be decoded back into the complex plane. An error signal 16 corresponding to the deviation of the detected symbol value from an expected symbol value is fed into PLL loop back filter 13 adjusting IF generator IF 12.

Figure 3:
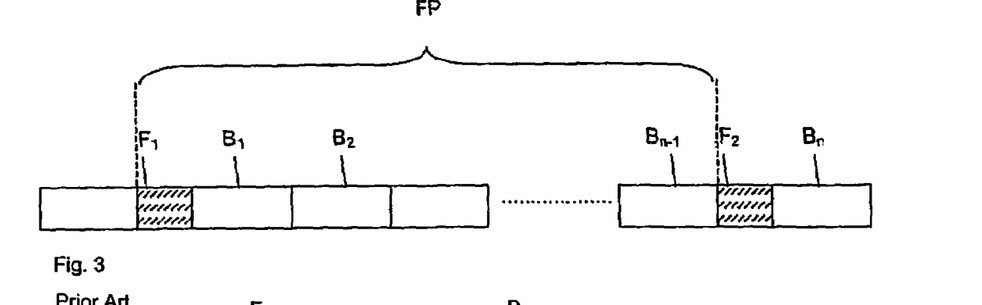
FIG. 3 shows a typical known frame timing diagram.
Figure 4:
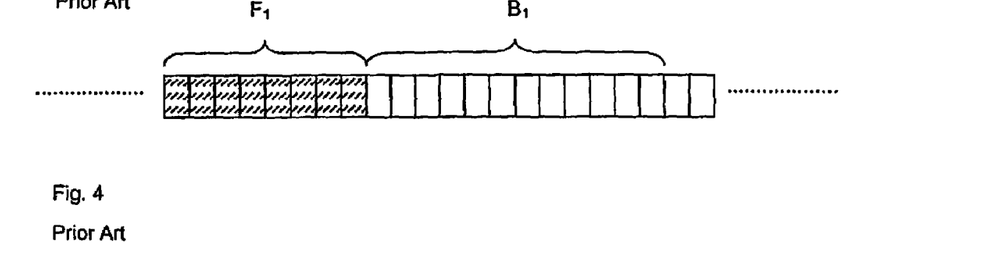

FIGS. 3 and 4 show a conventional scheme for transmitting data. A frame alignment word F1 consisting of a predetermined sequence of symbols functions as a reference for subsequent frames of traffic data B1, B2 ... BN–1. For example, the frame-word may have a length of 8 bits. After transmission of a fixed period of frames, the frame alignment word is repeated. Via a frame-aligner 15, in which the predetermined sequence is recovered, the demodulator, can identify the individual frame position for each frame.

As is shown in FIG. 4', the frame alignment word may comprise a single pilot signal P, which is discernible from the remaining traffic carrying symbols T.

An error signal vector E corresponding to the deviation of the detected symbol value D from an expected reference symbol value R is detected in de-mapper 14 and is fed into PLL loop back filter 13, which deviates a control value E', also denoted deviated error signal. For instance the angle $\phi$ between vectors for points D and R, can be calculated and used as error control signal E'.

The latter signal is used to adjust IF generator IF 12, so that the phase of signal from IF12 is rendered coherent with the signal of IF6.

Additive noise, which consists mainly of thermal noise in the receiving signal, will typically be transferred to the phase detector output. The noise part of the received signal constitutes a constant area around the transmitted constellation symbol, as the noise part is independent of the given symbol.

All QAM schemes larger than 4 have constellations for which the envelope varies for the individual symbols. Hence, if the error signal E is used directly and unprocessed for QAM schemes larger than 4, the noise transfer from symbols with a small envelope, G, will be much larger than symbols with a large envelope, H. This relation has been indicated in FIG. 3, which discloses detected symbols for a 16QAM constellation under the influence of thermal noise.

Therefore, a need has arisen as to compensate for noise contributions.

The optimum with respect to noise transfer would be to "equalise" the phase detector with regard to the envelope, hence to multiply the detected phase error with the envelope of the signal, as expressed below:

$$E' = \phi \cdot |D| \qquad \text{I}$$

where D is the detected signal and $\phi$ is the angle between the detected signal and the decided symbol reference R (square centre). Please confer FIG. 4.

However, the above calculation requires many programming instructions and is therefore not suitable for some applications.

A deviated signal, which is more easily calculated, is given by the expression:

$$E' = D\_Q \cdot R\_I - D\_I \cdot R\_Q \qquad \text{II}$$

where D is the detected signal and R is the decided symbol.

Figure 5:
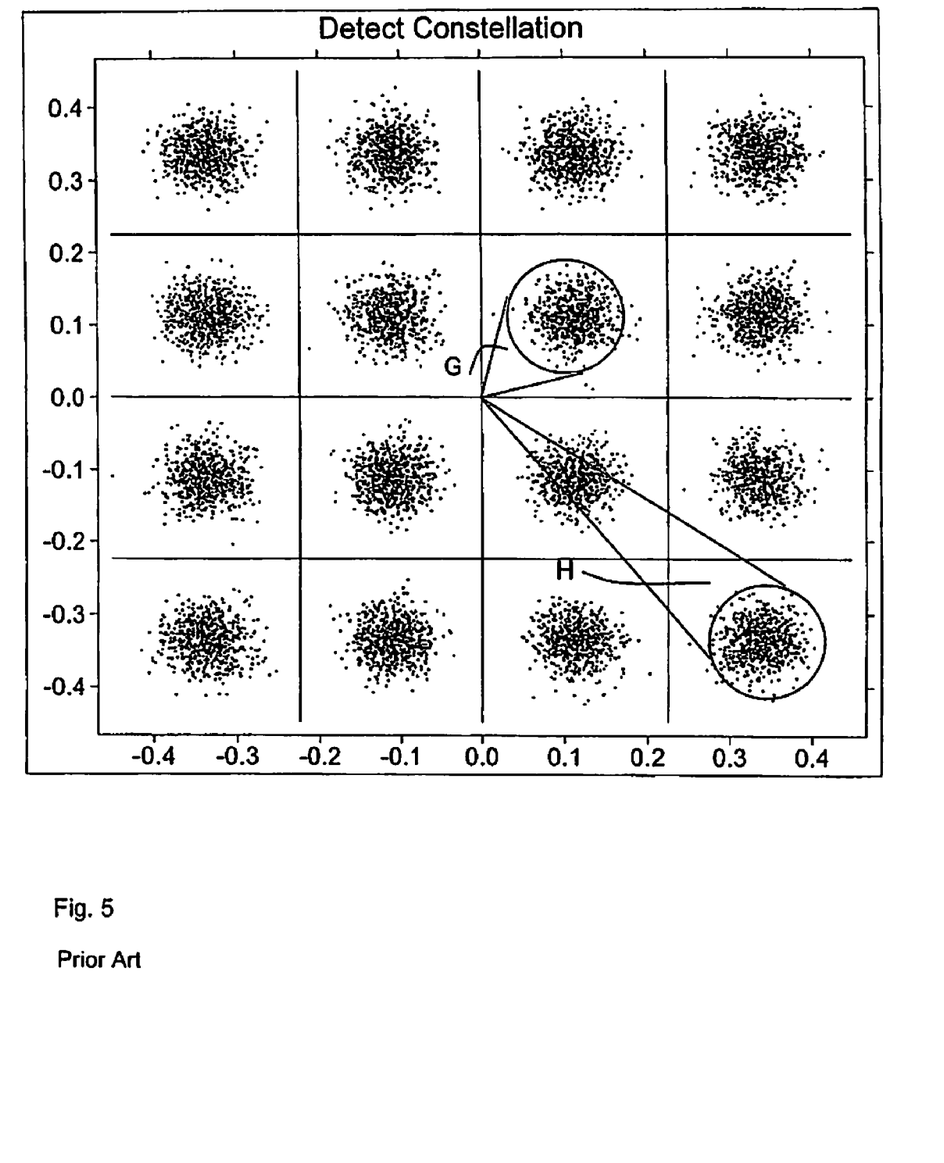
FIG. 5 shows thermal noise in a 16QAM-keying constellation.

In the latter case, the noise will get a "square" dependency related to the envelope of the signal. In FIG. 5 various lines have been shown for given values of control signals E' for relation II above.

In order to equalise the detected error with regard to noise, the error should be divided by the actual envelope. Hence, the following expression may be used:

$$\text{III:} \quad E' = \frac{D\_Q \cdot R\_I - D\_I \cdot R\_Q}{\sqrt{(D\_Q)^2 + (D\_I)^2}}$$

However, also the two above methods of noise balancing require relatively complex algorithms, which then again require extensive processing power in the receiver stage.

Prior art document U.S. Pat. No. 5,796,786 shows a phase error detection method in which a phase error value for the received data is obtained by subtracting the decided I-channel data and multiplying the sign of the difference by the difference itself and applying a weighting function to the phase error value. This signal is used for phase correction of received data. The weighting function is applied to reduce the wrong detection of a phase error caused by a decision error possibly generated in an adjacent error between symbols.

SUMMARY OF THE INVENTION

It is a first object of the invention to set forth a method, which provides for a robust high bit rate data transmission, which is bandwidth efficient, and which lessens requirements on the hardware.

This object has been achieved by the subject matter specified in claims 1 and 4 respectively.

It is a further object to set forth a method that provides noise balance with respect to the envelope of the QAM signal.

This object has been achieved by the subject matter defined by claim 1.

It is a further object to set forth a method, which provides suppression of noise, related to QAM decision thresholds.

This object has been achieved by claim 4.

More advantages will appear from the following detailed description of preferred embodiments of the invention.

BRIEF DESCRIPTION OF THE DRAWINGS

FIG. 4 shows a detail of FIG. 3,
FIG. 4' shows another known frame diagram.

DETAILED DESCRIPTION OF A PREFERRED EMBODIMENT OF THE INVENTION

According to a first preferred embodiment of the invention, noise equalisation is achieved by directly using the quadrature error components, E_Q and E_I, which are independent of the signal envelope.

Figure 8:
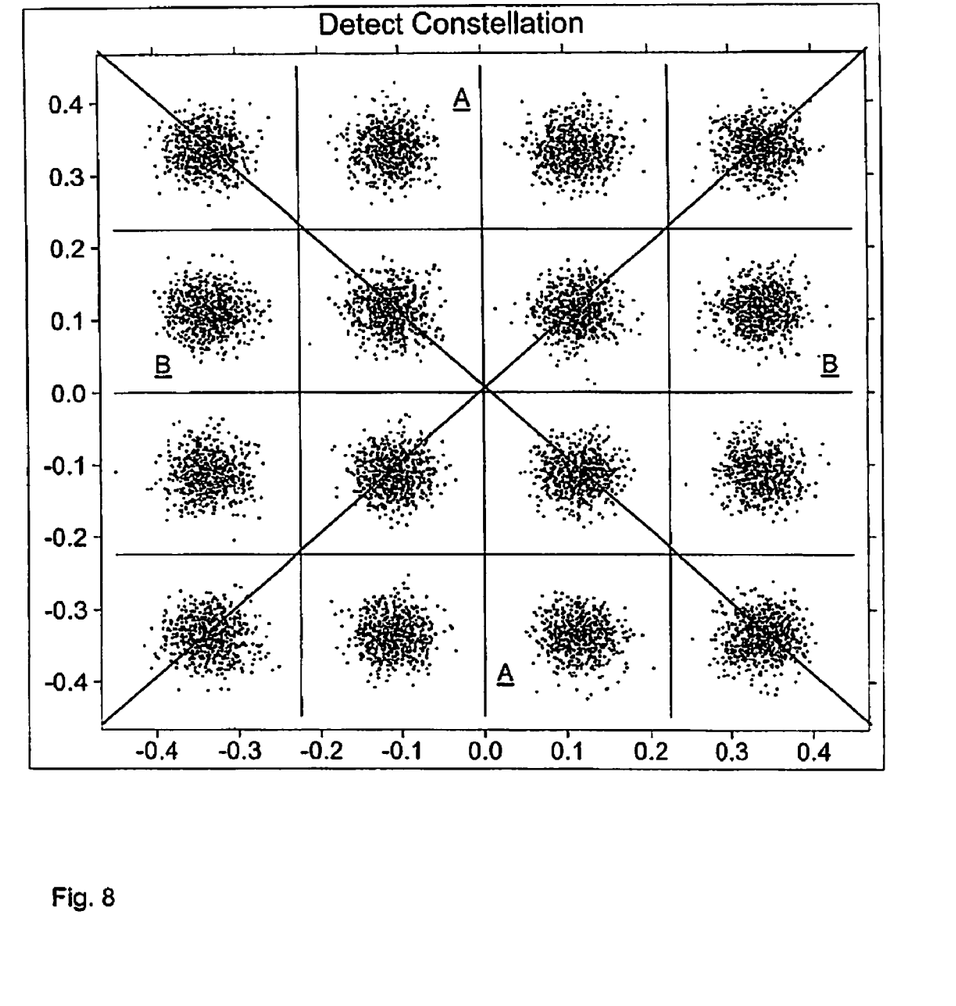
FIG. 8 shows an exemplary quadrant error correction scheme according to a first embodiment according to the invention.
Figure 9:
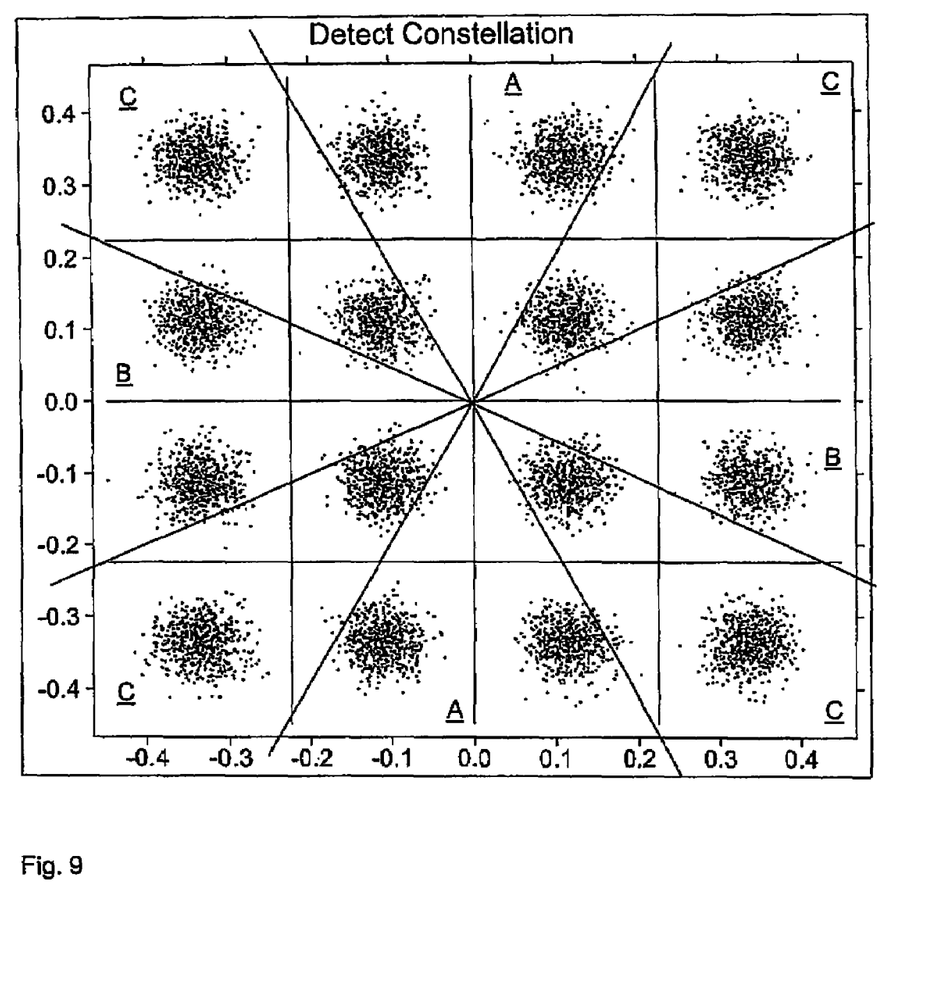
FIG. 9 shows an exemplary octant error correction scheme according to an alternative first embodiment according to the invention.

According to a first embodiment, as shown in FIG. 8, the constellation area is divided into 4 sectors for which the deviated error control signal E' is determined as follows in dependency of the detected symbol vector D:

for sector $A - |D\_Q| \geq |D\_I|$: $E'=E\_I$      IV for sector $B - |D\_Q| < |D\_I|$: $E'=E\_Q$      V According to a further aspect of the first embodiment, the constellation area is divided by four lines through the origin into 3 sectors, A, B and C, as shown in FIG. 9. The definition of these sectors and the deviated error control signal E' in the associated sectors are given as follows:

VI: for sector $A - |D\_Q| \geq 2 \cdot |D\_I|$: $E' \equiv E\_I$

VII: for sector $B - |D\_Q| < \frac{1}{2} \cdot |D\_I|$: $E' \equiv E\_Q$

VIII: for sector $C$ (non $A$, non $B$): $E' \equiv \frac{E\_I + E\_Q}{2}$

As appears, for sector A and B surrounding the I and Q axis, one of the orthogonal error components E_I or E_Q is used directly and unprocessed once it is detected to which sector the detected error symbol, D, belongs. For sector C in the "corner areas", the mean value of the orthogonal error components E_I or E_Q is used as deviated error control signal E'.

The deviation of the error control value E' is for instance carried out in the PLL loop back filter 13 of the receiver shown in FIG. 2.

It appears that the above steps of comparison and calculation can be easily accomplished by very few programming instructions.

Figure 6:
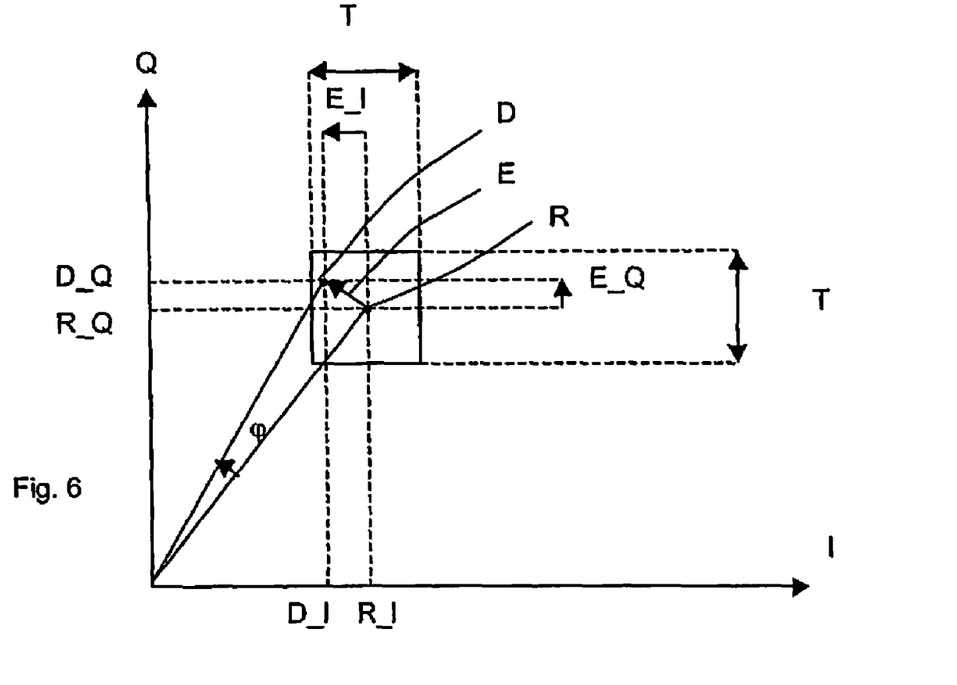
FIG. 6 shows details relating to an error vector E.
Figure 7:
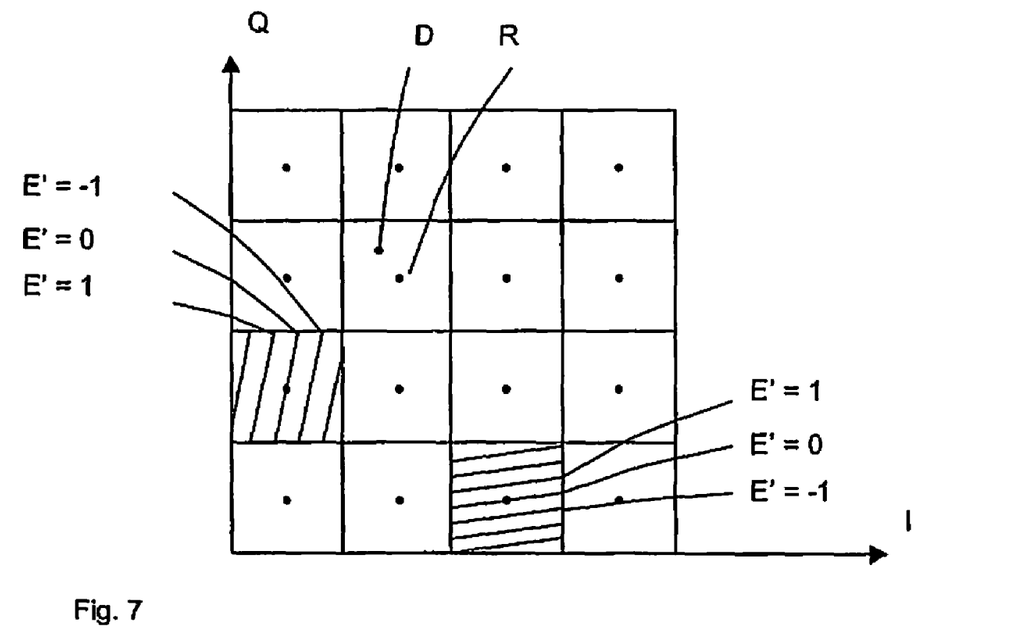
FIG. 7 shows curves for various derived control error values E' according to a known method in a 64-QAM system.

Another noise contributor is related to the thresholds of the QAM decision device, i.e. the symbol detection performed in de-mapper 14. When the detected symbol approaches the square shaped boundaries of size T, for instance shown in FIGS. 5 and 6, the noise contribution may lead to errors. In those cases where the noise component is larger than the distance to the symbol boundary, the error signal will get a wrong sign that will disturb the PLL tracking heavily.

According to the invention, this effect can be reduced by applying the above weighting function that suppresses the detector output for points close to the boundaries.

The weighting can be accomplished in a number of ways. However, according to the invention it is a basic objective to reduce the sharp transitions in the detector output when the detected signal D approaches the decision boundaries. Known demodulators have a typical "saw-tooth" like shape of the detector vs. phase error response. It is moreover an objective to subdue responses outside the detector boundaries.

Figure 12:
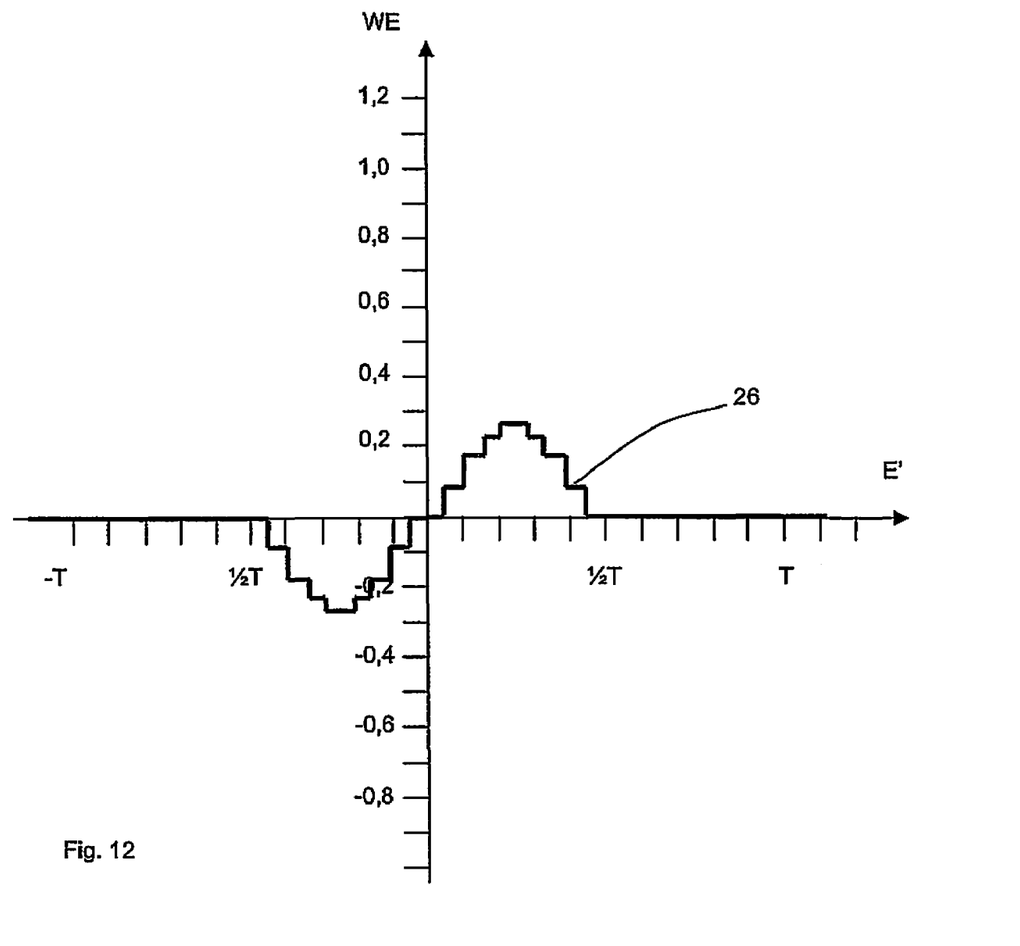
FIG. 12 shows an exemplary second parabolic error weighting function according to the second embodiment of the invention.

According to a preferred second embodiment of the invention the following relation is used for weighting the occurring symbol error:

VIII: $WE = E'\left(1 - \frac{2W}{T}\right)$ for $-\frac{1}{2}T \leq E' \leq \frac{1}{2}T$ where T corresponds to the boundary size as indicated in FIG. 12 and E' corresponds to deviated control error and W=Max{abs(E_I); abs(E_Q)}.

In principle, no values of E' will occur outside the above range of $+-\frac{1}{2}T$ once it has been detected to which symbol boundary E_Q and E_I belongs. Hence one alternative is to render the weighting function zero outside the above interval.

WE=0 for $E'<-\frac{1}{2}T \vee \frac{1}{2}T<E'$      IX

Generally, it applies, that the weighted error signal (WE) should approach zero for error signals (E) approaching zero.

The weighting function should also produce a positive value for positive values in the area close to zero and a negative value for negative values in the area close to zero. Moreover, the weighting function approaches zero when the error signal vector approaches the symbol boundaries of the detected symbol.

Figure 10:
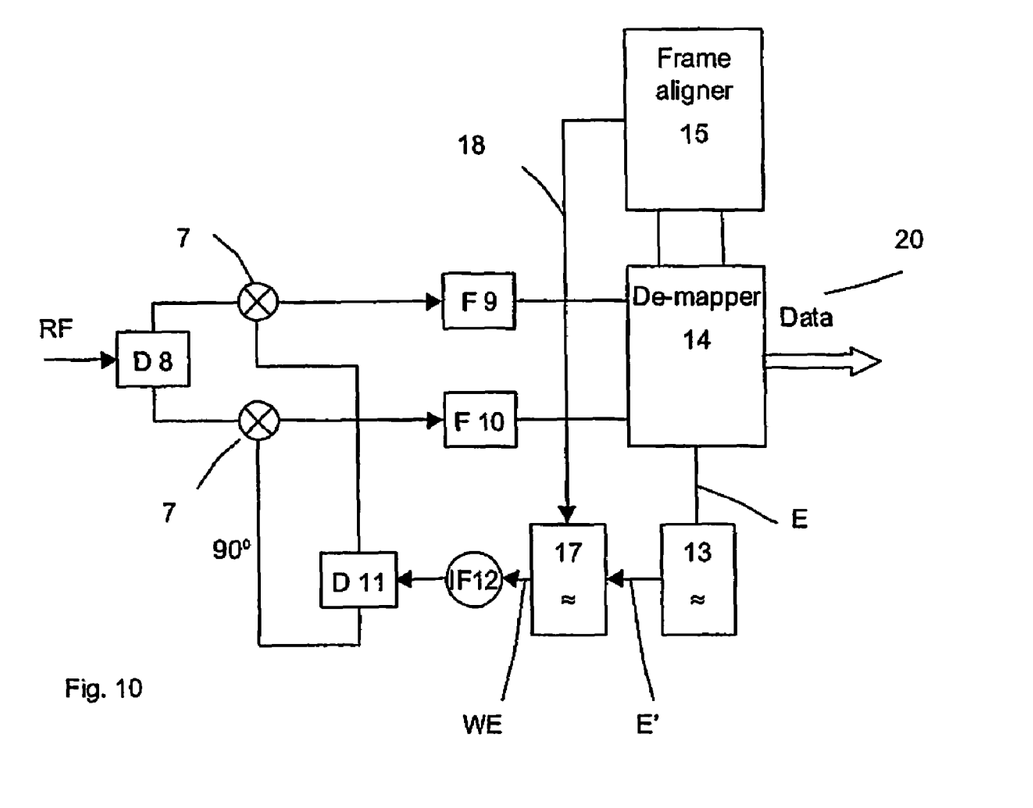
FIG. 10 shows an exemplary receiver for parabolic error weighting according to a second embodiment of the invention.

In FIG. 10, one embodiment for implementing the above method has been shown, wherein a weighting filter 17 performs the weighting of the derived error control signal E' and provides the feedback weighted control value WE for IF generator IF12. As appears from FIG. 10 an optional signal 18 from de-mapper 14 may enable or bar the weighting of some specific symbols.

The above weighting will result in a parabolic shape of the detector vs. phase error response. The error weighting has been illustrated by line 26 in FIG. 11.

Figure 11:
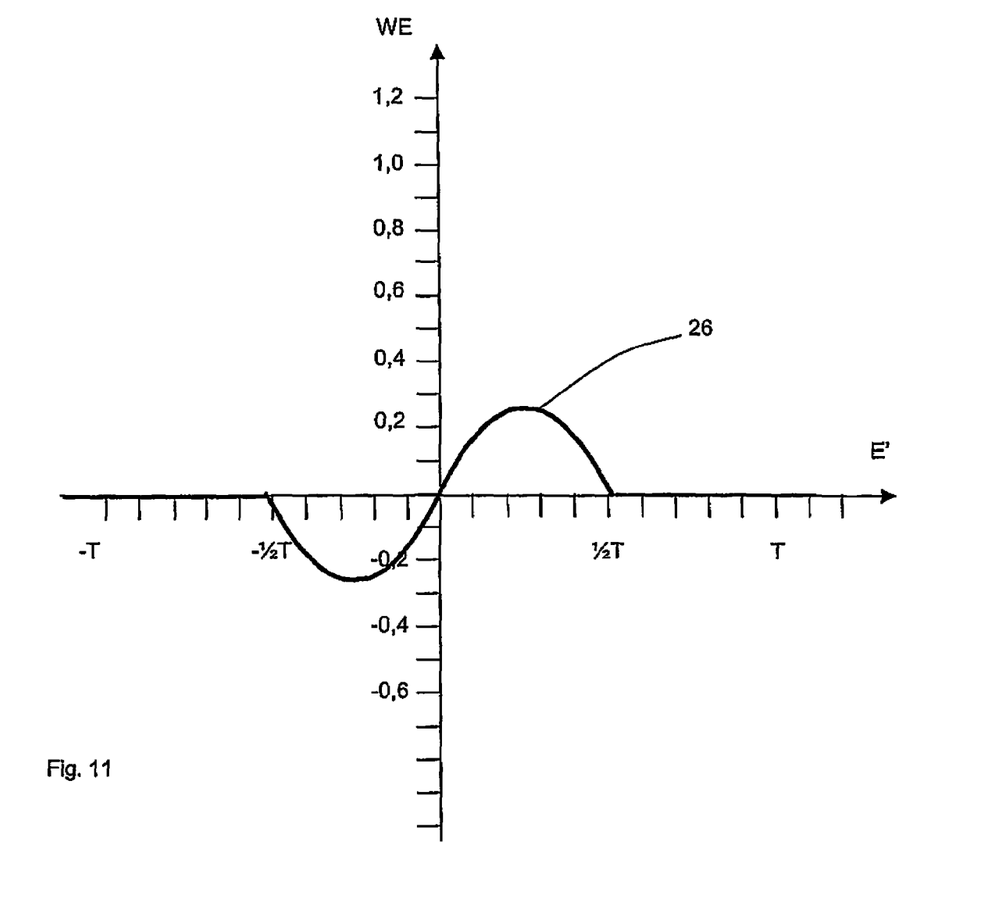
FIG. 11 shows an exemplary first parabolic error weighting function according to the second embodiment of the invention.

As appears from FIG. 11, the false phase errors, which otherwise would have occurred, if no weighting function were utilised are substantially reduced. Consequently, the possibilities for erroneously adjusting the PLL loop have been reduced.

In FIG. 12, an alternative weighting function using discrete values has been shown. As appears from the figure the curve shape of the weighted function is similar to the curve-shape of FIG. 11. However, a number of discrete values are used for simplicity.

As mentioned above it is an objective to subdue responses near the decision boundaries. However, according to a further embodiment of the invention, this only applies for the central symbols in the I/Q plane.

Figure 13:
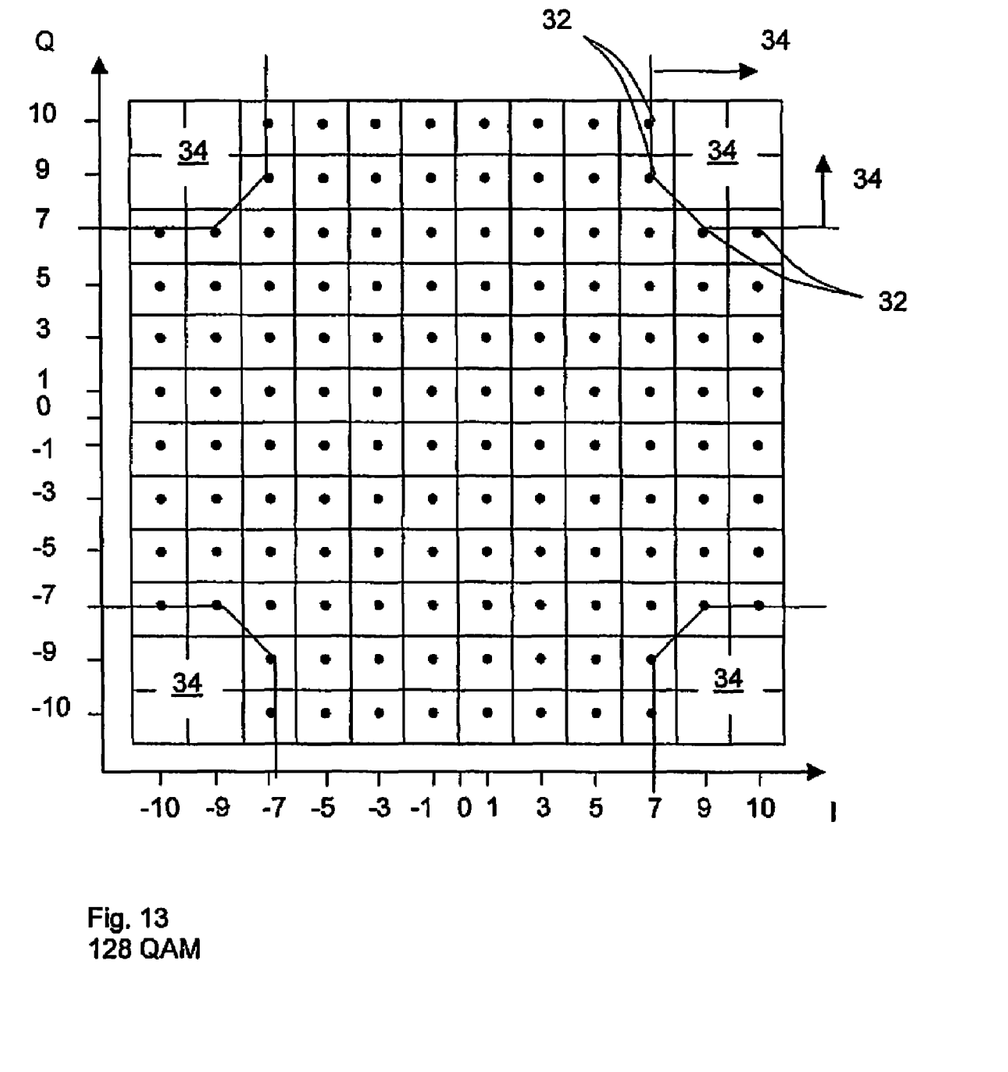
FIG. 13 shows an exemplary 128-QAm scheme according to a third embodiment of the invention.

In FIG. 13, an exemplary excerpt of a 128-QAM scheme has been shown. Eight outer signalling points 32 in the constellation define corners on a borderline to an outer area 34. If signals are detected in the outer corner area 34, the deviated error control signal is not weighted, WE=E'. On the other hand, if signals fall outside the symbol boundaries along the Q and I axes as indicated by the area 36, the weighting function WE=0 is applied. This leads to an improved burst error performance.

Hence, according to the invention an improved demodulator has been accomplished which lessens errors from occurring and enhances tracking capabilities although noise should occur in the demodulator.

The invention claimed is:

1. In a radio receiver in a communication system, a method of demodulating digital data, using M'ary QAM, comprising the steps of detecting a complex symbol vector D, establishing within which reference symbol boundaries the detected complex symbol vector D falls, the given reference symbol boundaries being associated with a complex reference vector, establishing quadrature components, which comprise a real quadrature component and an imaginary component, of an error vector, constituting a difference between the detected complex symbol vector D and the associated complex reference vector, and seeking to approximate an error control signal as a feedback signal in a demodulation stage, whereby when the detected complex symbol vector D falls within a first sector in a complex plane surrounding an imaginary axis (Q), the first sector being delimited by at least two lines crossing origin, the first sector being symmetrical with regard to the imaginary axis, approximating the error control signal by the imaginary quadrature component of the error vector, whereby when the detected complex symbol vector D falls within a second sector in the complex plane surrounding a real axis (I), the second sector being delimited by at least two lines crossing origin, the second sector being symmetrical with regard to the real axis, approximating the error control signal by the real quadrature component of the error vector; and when the detected complex symbol vector D belongs neither to the first sector nor to the second sector, approximating the error control signal by the mean value of the real quadrature component and the imaginary quadrature component.

2. The method according to claim 1, whereby the first sector is delimited by an area ID_QI>ID_II and the second sector is delimited by an area ID_QI<ID_II.

3. The method according to claim 1, whereby the first sector is delimited by an area ID_QI>2*ID_II, the second sector is delimited by an area ID_QI<½*ID_II.

4. The method according to claim 1, further comprising the steps of
using a weighted error signal, the error signal being a function of the error control signal as the feed-back signal in the demodulation stage, whereby
the weighted error signal
approaches zero for the error control signal approaching zero,
attains a positive value for positive values of the error control signal close to zero and attains a negative value for negative values close to zero,
approaches zero when the error signal vector approaches the symbol boundaries of the detected symbol.

5. The method according to claim 4, wherein when the error signal vector exceeds the symbol boundaries, the weighted error signal attains a reduced value or a zero value.

6. The method according to claim 5, wherein the error control signal is reduced according to $$WE = E'\left(1 - \frac{2W}{T}\right)$$

where E' corresponds to the deviated control error and T corresponds to the symbol boundary size and where W=Max{abs(E_I); abs(E_Q)}.

7. The method according to claim 4, wherein no weighting is performed for outer corner portions of the M'ary QAM constellation.

8. The method according to claim 7, wherein when the detected signal falls outside the symbol boundaries along the Q and I axes, the weighting function WE=0 is applied.

* * * * *

UNITED STATES PATENT AND TRADEMARK OFFICE
CERTIFICATE OF CORRECTION

PATENT NO. : 7,613,253 B2  Page 1 of 1
APPLICATION NO. : 10/519609
DATED : November 3, 2009
INVENTOR(S) : Weinholt It is certified that error appears in the above-identified patent and that said Letters Patent is hereby corrected as shown below:

On the Title Page, item (56), under "OTHER PUBLICATIONS", in Column 2, Line 3, delete "Ocmputer" and insert -- Computer --, therefor.

In Column 4, Line 1, in Equation "IV", delete " $A - |D\_Q| \geq |D\_I|: E' = E\_I$ " and insert -- $A - |D\_Q| \geq |D\_I|: \quad E' = E\_I$ --, therefor.

In Column 4, Line 3, in Equation "V", delete " $B - |D\_Q| < |D\_I|: E' = E\_Q$ " and insert -- $B - |D\_Q| < |D\_I|: E' = E\_Q$ --, therefor.

In Column 6, Line 18, in Claim 2, delete "ID_QI>ID_II" and insert -- |D_Q|>|D_I| --, therefor.

In Column 6, Line 19, in Claim 2, delete "ID_QI<ID_II." and insert -- |D_Q|<|D_I|. --, therefor.

In Column 6, Line 21, in Claim 3, delete "ID_QI>2*ID_II," and insert -- |D_Q|>2*|D_I|, --, therefor.

In Column 6, Line 22, in Claim 3, delete "ID_QI<½*ID_II." and insert -- |D_Q|<½*|D_I|. --, therefor.

In Column 6, Line 26, in Claim 4, delete "feed-back" and insert -- feedback --, therefor.

Signed and Sealed this

Twenty-third Day of March, 2010

David J. Kappos
*Director of the United States Patent and Trademark Office*